Figures 1, 2:
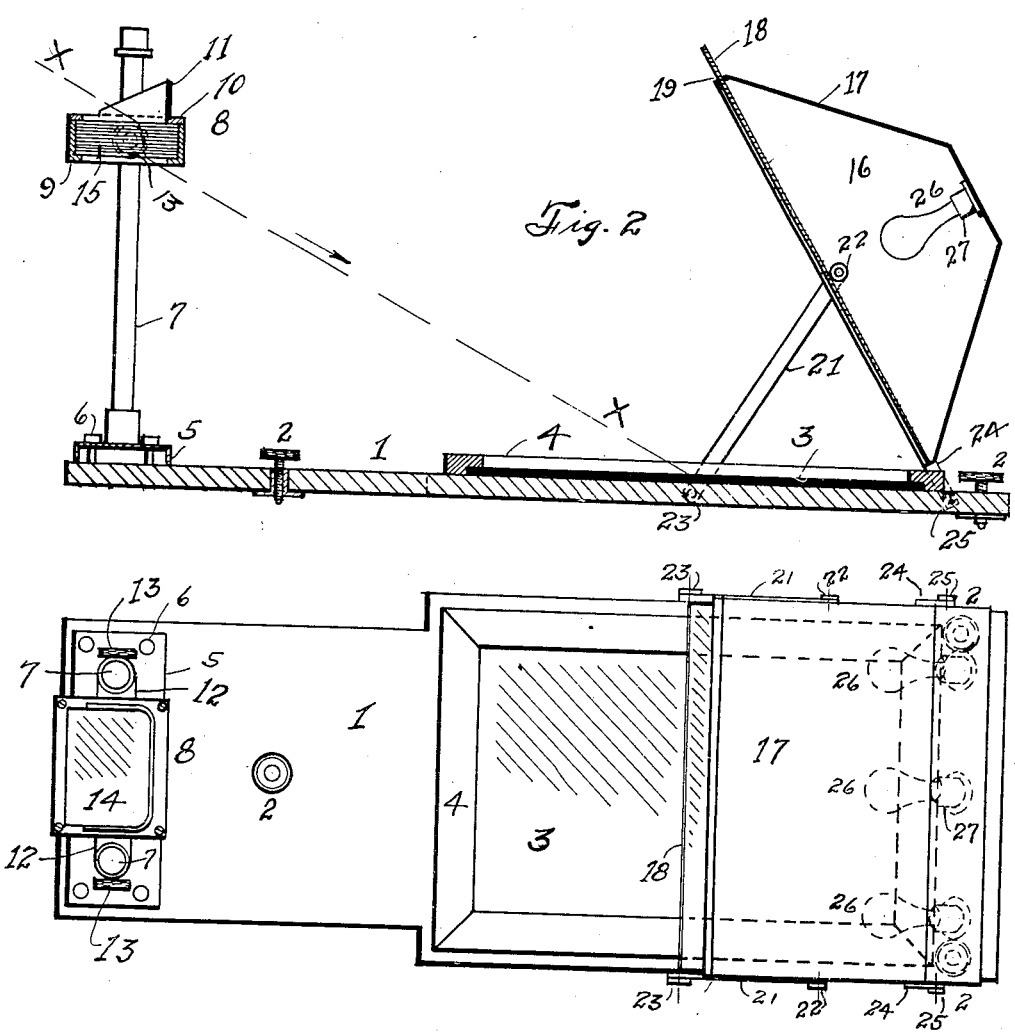

C. M. GARLAND.
SCLEROSCOPE FOR TESTING THE HARDNESS OR STRAIN IN GLASS DUE TO INSUFFICIENT ANNEALING.
APPLICATION FILED FEB. 9, 1916.

1,370,738.  Patented Mar. 8, 1921.

Witnesses:

Inventor
Claude M. Garland

UNITED STATES PATENT OFFICE.

CLAUDE M. GARLAND, OF CHICAGO, ILLINOIS.

SCLEROSCOPE FOR TESTING THE HARDNESS OR STRAIN IN GLASS DUE TO INSUFFICIENT ANNEALING.

1,370,738.        Specification of Letters Patent.        Patented Mar. 8, 1921.

Application filed February 9, 1916. Serial No. 77,345.

*To all whom it may concern:*

Be it known that I, CLAUDE M. GARLAND, a citizen of the United States, residing at Chicago, in the county of Cook and State of Illinois, have invented new and useful Improvements in Scleroscopes for Testing the Hardness or Strain in Glass Due to Insufficient Annealing, of which the following is a specification.

The temperature of the ware is gradually reduced from a temperature of about 1100° F. as it travels through the annealing ovens, which are maintained at a given temperature gradient throughout their length. If by accident the temperature gradient in the annealing oven is disturbed, the glass may be either under or over annealed. Over annealing does no injury to the ware. It, however, means that the ware remains in the oven for a longer period of time than is necessary which consequently cuts down the capacity of the oven and wastes fuel. If the glass is under annealed, however, it is left in a condition which is termed "hard" or "strained". In this condition the glass is liable to break at any time. A scratch on the surface or a change in temperature may start this breakage.

My invention has for its purpose the production of an instrument called a scleroscope which will show by inspection when any transparent glass object has been under annealed or is hard.

This I accomplish through the use of a beam of polarized light which is passed through the glass to be examined. The manner of utilizing the beam of polarized light will be brought out by reference to the accompanying drawing which forms a part of this specification. Referring to the drawing Figure 1 is a plan of the scleroscope and Fig. 2 is a sectional elevation taken through the center of Fig. 1.

The numeral 1 indicates a base which is provided with the leveling screws 2. 4 is a frame mounted on the base 1 which holds a piece of polished plate glass 3 the under side of which has been painted with a coat of black vanish. 5 indicates the base which supports the column 7. This base is mounted on the base 1 and held in place by the bolts 6. On the columns 7 is mounted the eye-piece 8 which is adapted to be raised or lowered and which is held in position by the set screws 13. The bosses 12 are bored out to receive the column 7 and the set screws 13 are threaded into the ends of these bosses.

The eye-piece 8 consists of a box 9 which is filled with from twenty to thirty polished glass plates 15, which are held in place by the cover 10. 11 is a hood which shields the eye when examining the ware.

16 is a diffusion lantern which is made up of the sheet metal sides 17 and contains the incandescent lamps 26 which are held in the sockets 27. A piece of frosted glass or other medium 18 is used to diffuse the light from the lamps 26. The diffusion lantern 16 is supported by the side pieces 21 and 24 over the frame 1, by the bolts 23 and 25. The diffusion lantern 16 is made removable so that the instrument may be used in natural light where this is available. The diffusion glass is essential to the operation of the instrument by artificial light. The concentrated light from the lamps for some cause fails to produce satisfactory results.

The operation of the instrument is as follows:—Light from the lamps 26 passes through the diffusion glass 18 and strikes the polished glass 3 and is reflected in the direction of the line XX. This light in being reflected undergoes polarization and when viewed through the eye-piece in the direction XX this light is not seen, that is theoretically, practically polarization is never complete so that the plate 3 is partially illuminated, but it is, however, much darker when viewed through the eye-piece than when viewed direct. The polarized light passing from the plate 3 on reaching the eye-piece 8 is bent upward as indicated due to the action of the glass plates 15. This beam of polarized light when it passes through glass which is not under strain due to insufficient annealing does not in any way change the appearance of the glass. If, however, strain is present the beam of polarized light is in some kinds of glass split up into the colors of the spectrum. This makes the glass or rather the strained portion of the glass show colored when viewed through the eye-piece 8. In other grades of glass the strain is shown by bluish white cloudy patches. The glass to be tested for strain is held between eye-piece 8 and the plate 3 while the observer looks in the direction XX. Where natural light is available the lantern 16 is removed and the reflector end of the instrument placed in this natural light.

The eye-piece 8 is known as an analyzer. In the past apparatus of this character has been used for the testing of glass, but in place of the bundle of plates what is termed a Nicol prism has been used. The Nicol prism is an expensive form of eye-piece and is often very difficult to obtain. It is also not large enough for the operator or observer to use both eyes in the examination of the ware. The small size of this prism, furthermore, does not permit of the use of a large volume of polarized light. Due to these several reasons I have found the use of the plates greatly superior to the use of the Nicol prism.

Having thus described my invention, I claim—

1. In an instrument of the type described, a base, a blackened reflector mounted on the said base, two columns mounted on the said base and adjacent one end of the said reflector, a frame slidably mounted on the said columns, a plurality of glass plates carried in the said frame and a hood forming a part of the said frame and shielding the said plates.

2. In an instrument of the type described, a base, a blackened reflector mounted on the said base, two columns mounted on the said base and adjacent one end of the said reflector, a frame slidably mounted on the said columns, a plurality of glass plates carried in the said frame, a hood for shielding the said plates and a lantern mounted over one end of the said reflector.

3. In an instrument of the type described, a base, a blackened reflector mounted on the said base, columns mounted on the said base and adjacent one end of the said reflector, a frame slidably mounted on the said columns, a plurality of glass plates carried in the said frame, a hood for shielding the said plates, a lantern mounted over the opposite end of the said reflector and a diffusion plate carried in the face of the said lantern, whereby the light from the said lantern is diffused over the said reflector substantially as described.

In testimony whereof I have signed my name to this specification in the presence of two subscribing witnesses.

CLAUDE M. GARLAND.

Witnesses:
MYRTLE B. GARLAND,
LILLIAN M. DRAGO.